(12) United States Patent
Hanai et al.

(10) Patent No.: US 12,473,869 B2
(45) Date of Patent: Nov. 18, 2025

(54) PRE-IGNITION DETERMINING APPARATUS FOR INTERNAL COMBUSTION ENGINE

(71) Applicant: TOYOTA JIDOSHA KABUSHIKI KAISHA, Toyota (JP)

(72) Inventors: Norihito Hanai, Toyota (JP); Masanori Toya, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/811,893

(22) Filed: Aug. 22, 2024

(65) Prior Publication Data

US 2025/0092840 A1   Mar. 20, 2025

(30) Foreign Application Priority Data

Sep. 19, 2023  (JP) ................. 2023-150913

(51) Int. Cl.
*F02D 41/22* (2006.01)
*F02B 43/00* (2006.01)

(52) U.S. Cl.
CPC ............ *F02D 41/22* (2013.01); *F02B 43/00* (2013.01)

(58) Field of Classification Search
CPC ................. F02B 43/00; F02D 41/22
See application file for complete search history.

(56) References Cited

U.S. PATENT DOCUMENTS

2008/0047530 A1* 2/2008 Cleeves .............. F01L 7/04
123/197.1

FOREIGN PATENT DOCUMENTS

JP     2013-160200 A    8/2013
JP     2017020354 A  *  1/2017

* cited by examiner

*Primary Examiner* — Kevin A Lathers
(74) *Attorney, Agent, or Firm* — Oblon, McClelland, Maier & Neustadt, L.L.P.

(57) ABSTRACT

A pre-ignition determining apparatus for an internal combustion engine using hydrogen as fuel is configured to determine an occurrence of pre-ignition based on an output value of a vibration sensor provided in the internal combustion engine. The pre-ignition determining apparatus includes processing circuitry that is configured to execute an accumulation process of calculating an accumulated value of the output value within a prescribed period prior to an ignition timing of an air-fuel mixture, and a determination process of determining the occurrence of pre-ignition based on the accumulated value.

10 Claims, 3 Drawing Sheets

PRE-IGNITION DETERMINING APPARATUS FOR INTERNAL COMBUSTION ENGINE

CROSS-REFERENCE TO RELATED APPLICATIONS

This application is based upon and claims the benefit of priority from prior Japanese Patent Application No. 2023-150913, filed on Sep. 19, 2023, the entire contents of which are incorporated herein by reference.

BACKGROUND

1. Field

The present disclosure relates to a pre-ignition determining apparatus for an internal combustion engine.

2. Description of Related Art

For example, in the internal combustion engine described in Japanese Laid-Open Patent Publication No. 2013-160200, the occurrence of pre-ignition is determined by comparing a peak value of an output value from a vibration sensor installed in the internal combustion engine with a prescribed threshold.

In an internal combustion engine that uses hydrogen as fuel, the vibrations generated when pre-ignition occurs can sometimes be low. Therefore, it can be challenging to determine the occurrence of pre-ignition based on the peak value of the output value from the vibration sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus is configured to determine an occurrence of pre-ignition based on an output value of a vibration sensor provided in an internal combustion engine using hydrogen as fuel. The apparatus includes processing circuitry. The processing circuitry is configured to execute an accumulation process of calculating an accumulated value of the output value within a prescribed period prior to an ignition timing of an air-fuel mixture, and a determination process of determining the occurrence of pre-ignition based on the accumulated value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a pre-ignition determining apparatus for an internal combustion engine 1 will be described with reference to FIGS. 1 to 3.

Configuration of Internal Combustion Engine

Figure 1:
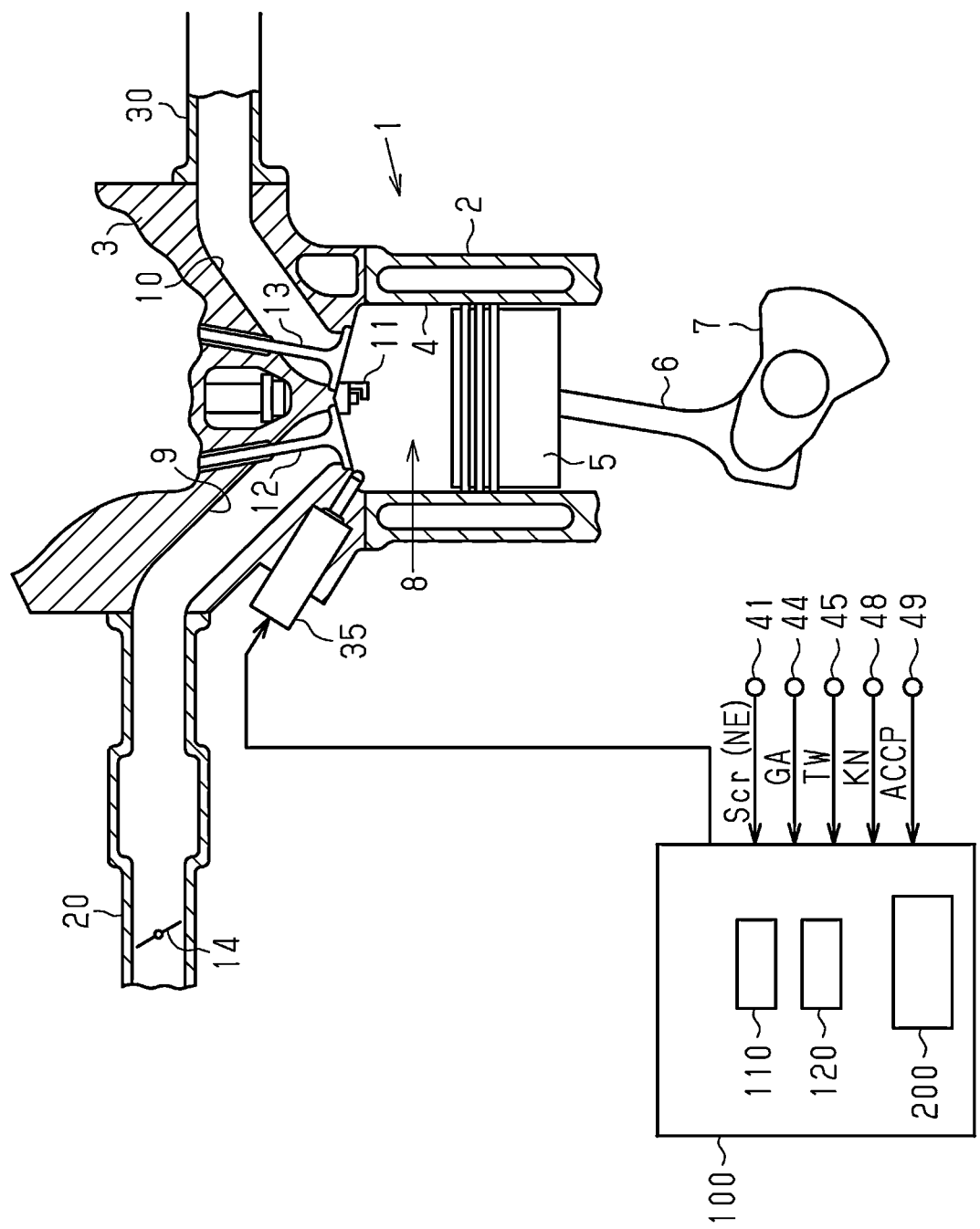
FIG. 1 is a schematic diagram of an internal combustion engine according to an embodiment.

As shown in FIG. 1, a cylinder block 2 of an internal combustion engine 1 is provided with a plurality of cylinders 4 (only one is shown). A piston 5 is provided in each cylinder 4, and the piston 5 is connected to a crankshaft 7 via a connecting rod 6.

A cylinder head 3 is coupled to an upper portion of the cylinder block 2. In each cylinder 4, a combustion chamber 8 is formed between the top surface of the piston 5 and the cylinder head 3. The cylinder head 3 is provided with a direct injection valve 35 that directly injects hydrogen gas, which is the fuel of the internal combustion engine 1, into the combustion chamber 8, and an ignition plug 11 that ignites the air-fuel mixture in the combustion chamber 8, for each cylinder 4.

The cylinder head 3 is provided with an intake port 9 and an exhaust port 10 which are connected to the combustion chamber 8. The intake port 9 constitutes a part of an intake passage through which intake air flows.

The intake port 9 is connected to an intake passage 20 provided with a throttle valve 14 that regulates an intake air amount. The intake port 9 is provided with an intake valve 12 for opening and closing the intake port 9.

The exhaust port 10 is provided with an exhaust valve 13 for opening and closing the exhaust port 10. The exhaust port 10 is connected to an exhaust passage 30.

Controller

The controller 100 includes a CPU110, a memory 120, a signal processing circuit 200, and the like. Various types of engine control and the like are executed by the CPU110 executing programs stored in the memory 120.

Various sensors are connected to the controller 100. For example, a crank angle sensor 41 that detects a rotation angle of the crankshaft 7, an air flow meter 44 that detects an intake air amount GA, and a water temperature sensor 45 that detects a cooling water temperature TW that is a temperature of cooling water of the internal combustion engine 1 are connected to the controller 100. A knocking sensor 48 that is a vibration sensor that outputs an output signal KN corresponding to the magnitude of vibration of the cylinder 4, an accelerator sensor 49 that detects an accelerator operation amount ACCP that is an operation amount of an accelerator pedal, and the like are connected to the controller 100.

The controller 100 calculates an engine rotation speed NE based on the output signal Scr of the crank angle sensor 41. The controller 100 calculates an engine load factor KL based on the engine rotation speed NE and the intake air amount GA. The engine load factor KL represents the ratio of the current cylinder inflow air amount to the cylinder inflow air amount at the time of steady operation of the internal combustion engine 1 in a state where the throttle valve 14 is fully opened at the current engine rotation speed NE. The cylinder inflow air amount is the amount of air flowing into each cylinder 4 in the intake stroke.

The controller 100 performs, as various kinds of engine control, opening degree control of the throttle valve 14, injection control of fuel injected from the direct injection valve 35, and ignition control of the ignition plug 11.

Determination of Pre-Ignition

The controller 100 functions as a pre-ignition determining apparatus that determines the occurrence of pre-ignition.

Hydrogen has a wider combustible concentration range than gasoline, and can be ignited even when the air-fuel ratio of the air-fuel mixture is lean. Therefore, in an internal combustion engine using hydrogen gas as fuel, pre-ignition may occur even immediately after fuel is injected into the combustion chamber 8. Depending on the position of the heat source where the pre-ignition has occurred, that is, the ignition starting point of the pre-ignition, the vibration generated in the cylinder 4 may be smaller than the vibration caused by the pre-ignition generated in the internal combustion engine using gasoline as fuel. Therefore, an object of the present embodiment is to appropriately determine the occurrence of such pre-ignition with less vibration.

Figure 2:
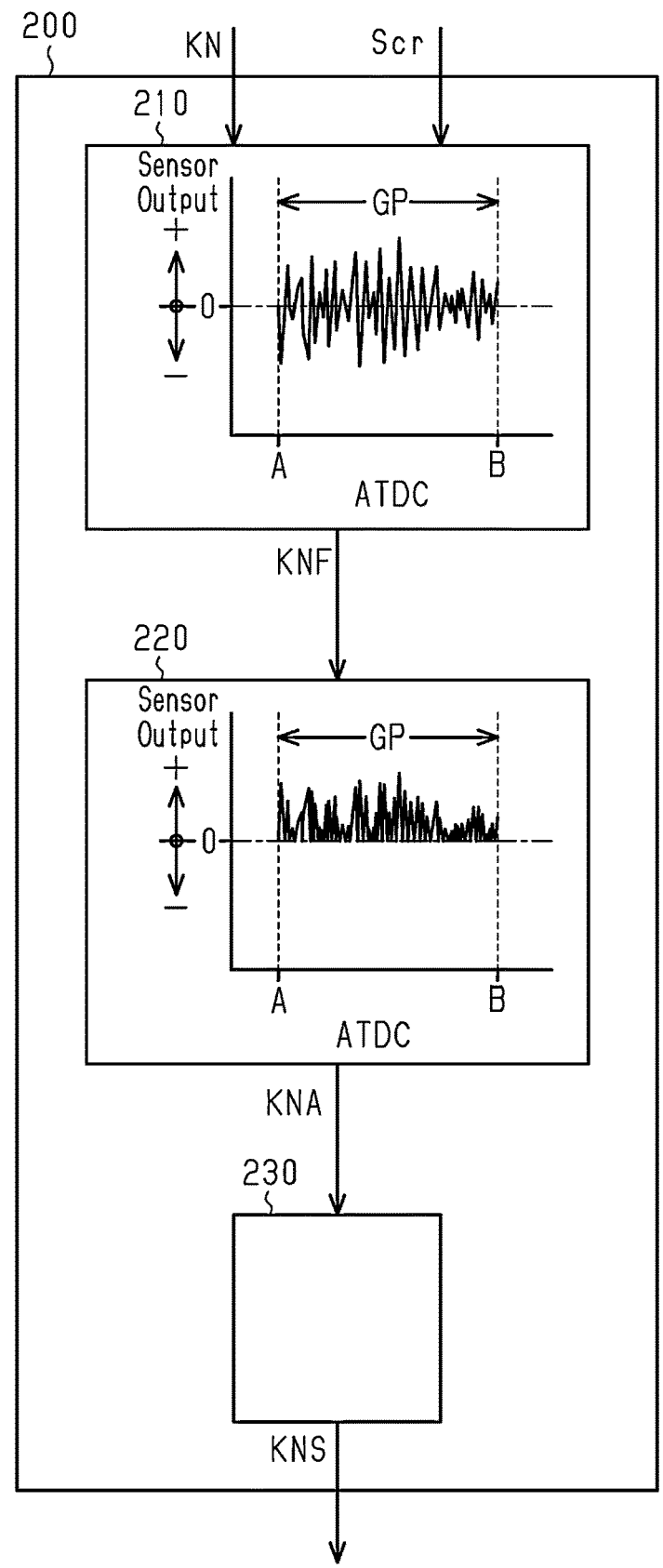
FIG. 2 is a diagram showing a configuration of a signal processing circuit of the controller shown in FIG. 1.

As shown in FIG. 2, the signal processing circuit 200 includes a filter circuit 210, a full-wave rectifier circuit 220, and an accumulation circuit 230.

The filter circuit 210 acquires the output signal KN of the knocking sensor 48 and the output signal Scr of the crank angle sensor 41 at a specified sampling period. The filter circuit 210 generates a filtered signal KNF by performing a filtering process on the output signal KN in a detection period GP.

The detection period GP is a prescribed period prior to the ignition timing of the air-fuel mixture, and is a period represented by a crank angle. Specifically, the detection period GP is a period that is unlikely to be affected by combustion in the cylinder 4 in which combustion has taken place immediately before the cylinder 4 that is the current determination target, and that includes a time at which the in-cylinder pressure at the occurrence of pre-ignition is maximum. For example, the detection period GP may be set to the period from the starting time point of fuel injection executed during a compression stroke to the time point at which the piston 5 reaches the compression top dead center. A filter frequency, which is set when the filtering process is executed, is set in advance to a value suitable for removing vibrations generated when the intake valve 12 and the exhaust valve 13 are seated, vibrations generated when the direct injection valve 35 is driven, ignition noise of the ignition plug 11, and the like.

The full-wave rectifier circuit 220 generates an absolute value signal KNA obtained by converting the filtered signal KNF into an absolute value. In other words, the full-wave rectifier circuit 220 inverts the sign of the filtered signal KNF having a negative value among the filtered signals KNF to convert the filtered signal KNF into a positive value.

The accumulation circuit 230 calculates an accumulated value KNS by accumulating the absolute value signal KNA generated by the full-wave rectifier circuit 220. Specifically, the accumulation circuit 230 calculates the accumulated value KNS, which is a value obtained by accumulating the absolute value of the filtered signal KNF generated from the output signal KN within the detection period GP. The controller 100 executes a determination process of determining the occurrence of pre-ignition by comparing the accumulated value KNS with a threshold KNSref.

Figure 3:
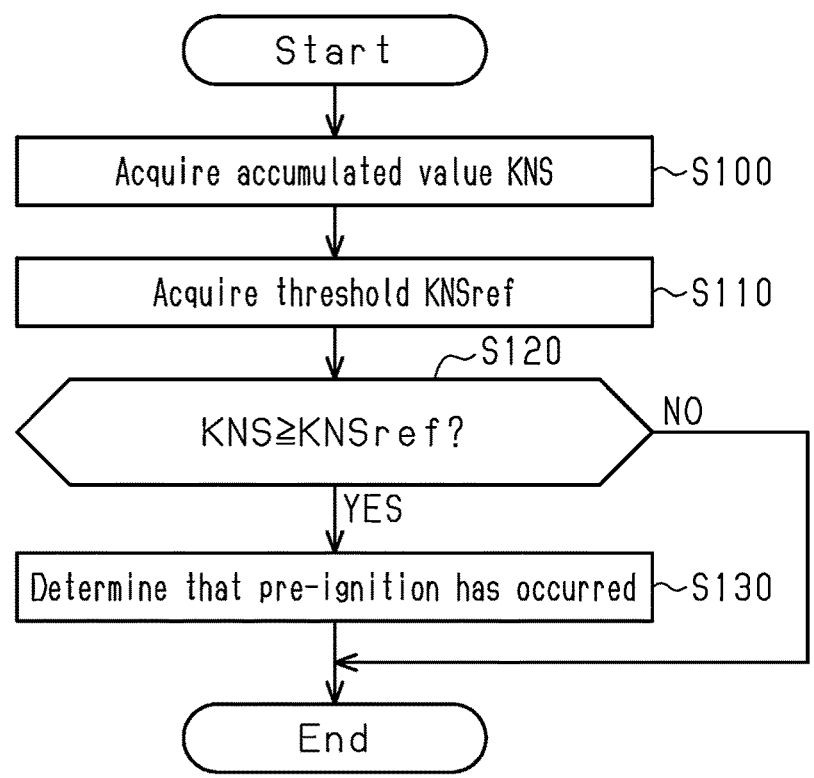
FIG. 3 is a flowchart showing a procedure of processes executed by the controller shown in FIG. 1.

FIG. 3 shows a procedure of a pre-ignition determination process executed by the controller 100. The process shown in FIG. 3 is implemented by the CPU 110 executing programs stored in the memory 120. The process shown in FIG. 3 is executed each time the accumulated value KNS is calculated. In the following description, the number of each step is represented by the letter S followed by a numeral.

When the series of processes shown in FIG. 3 is started, the controller 100 acquires the calculated accumulated value KNS (S100).

Next, the controller 100 acquires the threshold KNSref (S110). In the process of S110, the controller 100 acquires the threshold KNSref, which is set based on the engine operating state. Specifically, the controller 100 sets the threshold KNSref based on the engine rotation speed NE and the engine load factor KL. The engine rotation speed NE and the engine load factor KL referred to at this time are, for example, an instantaneous value of the engine rotation speed NE at a predetermined time point within the detection period GP and an instantaneous value of the engine load factor KL at a predetermined time point within the detection period GP. The engine rotation speed NE and the engine load factor KL referred to at this time may be, for example, an average value of the engine rotation speed NE in the detection period GP and an average value of the engine load factor KL in the detection period GP.

The threshold KNSref is a value corresponding to the accumulated value KNS calculated during normal combustion, in which pre-ignition is not occurring. The value of the threshold KNSref is set such that the controller 100 can accurately determine that pre-ignition is occurring based on the accumulated value KNS being greater than or equal to the threshold KNSref.

Next, the controller 100 determines whether the accumulated value KNS is greater than or equal to the threshold KNSref (S120). If it is determined that the accumulated value KNS is greater than or equal to the threshold KNSref (S120: YES), the controller 100 determines that pre-ignition has occurred within the detection period GP (S130).

In a case in which the process of S130 is executed, or in a case in which a negative determination is made in the process of S120, the controller 100 ends the process.

Operation and Advantages of Present Embodiment (1) In the present embodiment, the accumulation process of calculating the accumulated value KNS of the output signal KN of the knocking sensor 48 in the detection period GP before the ignition timing of the air-fuel mixture and the determination process of determining the occurrence of pre-ignition based on the accumulated value KNS are executed. In this determination process, the occurrence of pre-ignition is determined by comparing the accumulated value KNS with the threshold KNSref. Thus, the occurrence of pre-ignition is determined based on the accumulated value KNS of the output signal KN of the knocking sensor 48. Therefore, as compared with the case in which the occurrence of pre-ignition is determined based on the peak value of the output signal KN of the knocking sensor 48, the difference between the time of abnormal combustion in which pre-ignition occurs and the time of normal combustion in which pre-ignition does not occur becomes clear. Therefore, even when pre-ignition with less vibration occurs in the internal combustion engine 1 or the like using hydrogen as fuel, the occurrence of pre-ignition can be appropriately determined.

(2) The accumulated value KNS calculated during normal combustion in which pre-ignition has not occurred changes in accordance with the engine operating state. In this regard, according to the present embodiment, the threshold KNSref is set based on the engine operating state, so it is possible to appropriately set the threshold KNSref.

Modifications

The above-described embodiment may be modified as follows. The above-described embodiment and the following modifications can be combined as long as the combined modifications remain technically consistent with each other.

The determination process of the above-described embodiment determines the occurrence of pre-ignition by comparing the accumulated value KNS with the threshold KNSref. In another embodiment, the accumulated value KNS calculated when pre-ignition is not occurring may be used as a normal value. Then, as the determination process, the occurrence of pre-ignition may be determined by comparing the ratio of the calculated accumulated value KNS to the normal values with a prescribed threshold KNRref.

Figure 4:
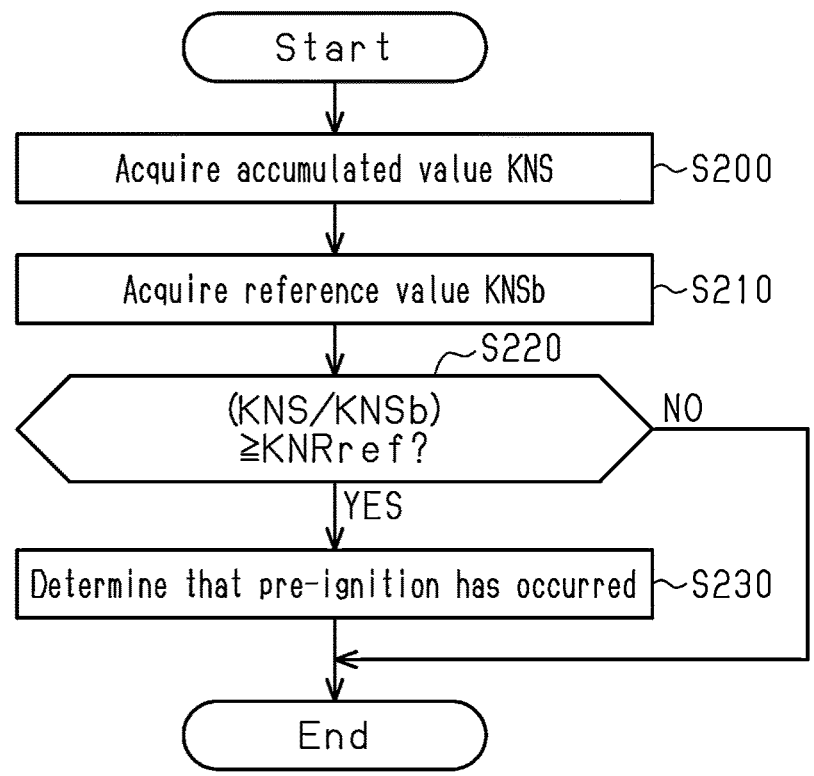
FIG. 4 is a flowchart showing a procedure of processes executed by a controller according to a modification.

FIG. 4 shows the procedure of a determination process in this modification. When the series of processes shown in FIG. 4 is started, the controller 100 acquires the calculated accumulated value KNS (S200).

Next, the controller 100 acquires a reference value KNSb (S210). The reference value KNSb is the normal value described above. In the process of S210, the controller 100 acquires the reference value KNSb, which has been set based on the engine operating state. Specifically, the controller 100 sets the reference value KNSb based on the engine rotation speed NE and the engine load factor KL. The engine rotation speed NE and the engine load factor KL referred to at this time are, for example, an instantaneous value of the engine rotation speed NE at a predetermined time point within the detection period GP and an instantaneous value of the engine load factor KL at a predetermined time point within the detection period GP. The engine rotation speed NE and the engine load factor KL referred to at this time may be, for example, an average value of the engine rotation speed NE in the detection period GP and an average value of the engine load factor KL in the detection period GP.

Next, the controller 100 determines whether the ratio of the accumulated value KNS to the reference value KNSb is greater than or equal to the threshold KNRref (S220). The ratio of the accumulated value KNS to the reference value KNSb is a value obtained by dividing the accumulated value KNS by the reference value KNSb. The value of the threshold KNRref is set in advance such that the controller 100 can accurately determine that pre-ignition is occurring based on the ratio of the accumulated value KNS to the reference value KNSb being greater than or equal to the threshold KNRref.

When it is determined that the ratio of the accumulated value KNS to the reference value KNSb is greater than or equal to the threshold KNRref (S220: YES), the controller 100 determines that pre-ignition has occurred within the detection period GP (S230).

In a case in which the process of S230 is executed, or in a case in which a negative determination is made in the process of S220, the controller 100 ends the process.

In the case of this modification, unlike the above-described embodiment in which the accumulated value KNS is directly compared with the threshold KNSref, the threshold KNRref can be set to a constant fixed value. Further, the accumulated value KNS calculated at the time of normal combustion when pre-ignition is not occurring changes in accordance with the engine operating state. In this regard, according to this modification, since the reference value KNSb is set based on the engine operating state, it is possible to appropriately set the reference value KNSb.

The accumulated value KNS may be calculated by the arithmetic processing of the CPU110.

The controller 100 includes the CPU 110 and the memory 120 and executes software processing. However, this is merely an example. For example, the controller 100 may include a dedicated hardware circuit (such as an ASIC) that executes at least part of the software processing executed in the above-described embodiments. That is, the controller 100 may be modified as long as it has any one of the following configurations (a) to (c). (a) A configuration including a processor that executes all of the above-described processes according to programs and a program storage device such as a memory that stores the programs. (b) A configuration including a processor and a program storage device that executes part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the processing may be executed by a processing circuit including at least one of one or a plurality of software circuits and one or a plurality of dedicated hardware circuits. The program storage device, which is a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An apparatus configured to determine an occurrence of pre-ignition based on an output value of a vibration sensor provided in an internal combustion engine using hydrogen as fuel, the apparatus comprising:
processing circuitry,
wherein the processing circuitry is configured to execute:
a filtered signal generation process of receiving an output signal of the vibration sensor in a detection period, which is a predetermined period prior to an ignition timing of an air-fuel mixture, and generating a filtered signal by performing a filtering process on the output signal;

an absolutizing process of generating an absolute value signal obtained by converting the filtered signal into an absolute value;

an accumulation process of calculating an accumulated value of the absolute value signal within the detection period; and a determination process of determining the occurrence of pre-ignition based on the accumulated value.

2. The apparatus according to claim 1, wherein the determination process is a process of determining the occurrence of pre-ignition by comparing the accumulated value with a prescribed threshold.

3. The apparatus according to claim 2, wherein the determination process determines the occurrence of pre-ignition when the accumulated value is greater than or equal to the prescribed threshold.

4. The apparatus according to claim 2, wherein the threshold is set based on an engine operating state.

5. The apparatus according to claim 4, wherein
the engine operating state includes an engine rotation speed and an engine load factor, and
the processing circuitry is configured to further execute:
an engine rotation speed calculation process of calculating an engine rotation speed based on an output signal of a crank angle sensor; and
an engine load factor calculation process of calculating an engine load factor based on the engine rotation speed and an intake air amount.

6. The apparatus according to claim 1, wherein
the accumulated value calculated when pre-ignition is not occurring is a normal value, and
the determination process is a process of determining the occurrence of pre-ignition by comparing a ratio of the accumulated value calculated in the accumulation process to the normal value with a prescribed threshold.

7. The apparatus according to claim 6, wherein the normal value is set based on an engine operating state.

8. The apparatus according to claim 7, wherein
the engine operating state includes an engine rotation speed and an engine load factor, and
the processing circuitry is configured to further execute:
an engine rotation speed calculation process of calculating an engine rotation speed based on an output signal of a crank angle sensor; and
an engine load factor calculation process of calculating an engine load factor based on the engine rotation speed and an intake air amount.

9. The apparatus according to claim 1, wherein the detection period is period from a starting time point of fuel injection executed during a compression stroke to a time point at which a piston reaches a compression top dead center.

10. The apparatus according to claim 1, wherein the vibration sensor measures a magnitude of vibration of a cylinder of the internal combustion engine.

* * * * *